United States Patent Office 3,119,818
Patented Jan. 28, 1964

3,119,818
PROCESS FOR PREPARING 2-p-AMINOBENZENE-SULPHONAMIDO-4,6-DIMETHYLPYRIMIDINE
Aldo Garzia, Milan, Italy, assignor to Istituto Chemioterapico Italiano S.p.A., Milan, Italy
No Drawing. Filed Feb. 8, 1962, Ser. No. 171,812
Claims priority, application Italy Nov. 30, 1961
4 Claims. (Cl. 260—239.75)

Methods known theretofore for preparing 2-p-aminobenzene sulphonamido-4,6-dimethyl-pyrimidine (sometimes called sulphomethazine or sulphodimidine) are based on two fundamental processes:

(1) Reaction of a p-acetaminobenzenesulphohalide and 2-amino-4,6-dimethyl pyrimidine and subsequent hydrolysis, or reaction of p-amino-benzenesulphonamide and a 2-halo-4,6-dimethyl-pyrimidine;

(2) Reaction of p-amino-benzenesulphonamidoguanidine and acetylacetone under suitable conditions.

The first process is objectionable in the following respects:

(a) Preparation of 2-amino-4,6-dimethyl-pyrimidine is not economically convenient, inasmuch as the output of reaction is low; preparation of 2-halo-4,6-dimethyl-pyrimidine is neither easy (on account of the use of halogenated derivatives) nor economically convenient.

(b) Reaction of p-acetaminobenzenesulphohalide and the necessary pyrimidine takes place only with starting products of high purity, under total absence of water, in the presence of a tertiary amine. Tertiary amines are considerably expensive and are subject to losses at the recovery stage. Reaction of p-amino-benzenesulphonamide and 2-halo-4,6-dimethyl-pyrimidine is objectionable in the same respects.

(c) The reaction of p-acetaminobenzenesulphohalide and 2-amino-4,6-dimethyl-pyrimidine is followed by a final acid or alkaline hydrolysis which leads to further reduction in output and difficulties in purification of the products.

The second process (direct reaction of p-amino-benzenesulphonamido-guanidine and acetylacetone) yields theoretically a higher output and is easier in use; however, optimum conditions for reaction could not be determined heretofore.

In some processes reaction is carried out in an autoclave under pressure with inherent technical difficulties, unsatisfactory output and final product giving rise to difficulties in purification; other processes are based on the use of acetic acid as a solvent at its boiling temperature and lead to a raw product which is difficult to discolor and low in output. The industrial plant for carrying out the reaction under these conditions should meet special requirements, also in order to recover the solvent.

It has now been found that 2-p-amino-benzenesulphonamido-4,6-dimethyl-pyrimidine can be obtained with an almost quantitative output by reacting acetylacetone with p-amino-benzenesulphonamido-guanidine in an aqueous solution at a temperature between 80° and 120° C.

According to a preferred embodiment of this invention the acetylacetone required for reaction is set free in the aqueous solution itself from its sodium salt by an acid present in an equimolar quantity with respect to the sodium salt. Acetic acid and carbonic acid are more particularly suitable. Hydrochloric and sulphuric acids also yield satisfactory results; of course, still other acids can be employed, which are capable of displacing the acetylacetone from its sodium salt.

In actual practice the three reagents, namely the sodium salt, acid and p-amino-benzenesulphonamido-guanidine are dissolved in water at the abovementioned temperature, the said temperature being maintained till completion of the reaction. The reaction time mainly depends upon temperature but is in any case not longer than 24 hours.

The optimum temperature ranges between 95 and 110° C. At lower temperatures the rate of reaction is excessively low, while at higher temperatures the reaction product takes a slightly yellowish tinge. The optimum pH value of the reaction ranges between 5 and 6. In respect of output it should be provided for checking the pH during reaction and, if necessary, returning it to its optimum value by the addition of acid. However, reaction proceeds satisfactorily even at pH<5 and at pH>6, however not >7.

The water quantity employed is the quantity essential for maintaining the reagents in solution at the predetermined temperature at the start of reaction. A smaller water quantity leads to a reduction in output, inasmuch as p-amino-benzene-sulphonamidoguanidine which is not dissolved, does not take part to the reaction and contaminates the final product; a larger water quantity does not afford any advantage in respect of either output or standard of the product.

Reaction proceeds between equimolar quantities of reagents; however, in view of final efficiency operation should conveniently be carried out with excess p-aminobenzenesulphonamidoguanidine.

In order to favour the reaction the excess should amount to 2 to 10 mols percent; higher quantities do not afford any advantage. It should be noted that all of the excess is recovered at the end of reaction.

An excess over the stoichiometric quantity of sodium acetylacetonate does not afford any advantage; excess acid is detrimental both to output and standard of the product.

During progress of reaction 2-p-amino-benzene-sulphonamido-4,6-dimethyl-pyrimidine formed is precipitated. At the end of reaction the still hot mixture is filtered. The solids comprise the desired product, while in the filtrate unreacted p-amino-benzenesulphonamido-guanidine crystallizes on cooling, is filtered and recycled.

The reaction is considered to be completed when a sample of the reaction liquid treated with a ferrichloride solution no longer gives a purple red coloring.

The practical advantages of the above method are of considerable importance and easily understood. In fact:

(a) An analytically pure final product is obtained with an output exceeding 90% of the theory.

(b) Operation is carried out in an aqueous medium eliminating the necessity for recovery of the solvents.

(c) It is possible to operate at ambient pressure in a neutral condition, whereby the apparatus is considerably simplified.

(d) The sodium salt of acetylacetone is employed, which is necessarily an intermediate product of the manufacture of acetylacetone. This implies that it is not necessary for the purposes of this invention to manufacture acetylacetone, and the synthesis can be stopped once the sodium salt is obtained. This circumstance is of great importance because in preparing acetylacetone the most critical and expensive operation is its preparation from its sodium salt.

According to a further embodiment of this invention, which is more particularly suitable for a continuous or semi continuous operation, the sodium salt of acetylacetone and its decomposing acid are continuously supplied to a hot water flow, thereby setting free acetylacetone, the resulting solution being admixed (in a continuous manner or at time intervals) with p-amino-benzene-sulphonamido-guanidine, while the solution is maintained at a temperature ranging between 80° C. and 120° C. The reaction mass is then conveyed to a reactor, which may comprise a long coil or an autoclave, maintained at the abovementioned temperature and capable of causing the mass to dwell therein the required period of time for completing reaction.

*Example I*

A flask heated in an oil bath is filled with 600 ml. water and 60 g. (1 mol) glacial acetic acid (or an equivalent quantity of diluted acetic acid). While stirring 235 g. (1.1 mols) anhydrous p-aminobenzenesulphonamidoguanidine (or an equivalent quantity of a non anhydrous product) and 122 g. (1 mol) sodium acetylacetonate 100% purity (or an equivalent quantity of product of a lower purity) are introduced into the flask while stirring.

The temperature of the reaction mixture is brought to 102–103° C., the mixture is further stirred at this temperature during 24 hours. The pH value of the mixture, which should range between 5 and 6 is checked during the reaction.

On expiry of the reaction period heating is cut off, the mass being cooled or allowed to cool down to 60° C.

Filtering under suction is effected, the solids on the filter being washed with 100 ml. water at 80° C.

After drying of the product on the filter 256 g. 2-p-amino-benzenesulphonamido - 4,6 - dimethyl-pyrimidine, melting point 196–197° C., purity 99.5% are obtained. The output is 92% of the theory calculated with respect to the sodium acetylacetonate employed.

About g. 20 p-amino-benzenesulphonamido-guanidine are recovered by cooling from the filtrate of the reaction mixture.

*Example II*

Ml. 600 water and g. 100 36% hydrochloric acid (1 mol) or an equivalent quantity of more diluted acid are introduced into a flask heated in an oil bath.

G. 214 (1 mol) p-amino-benzenesulphonamido-guanidine and g. 122 (1 mol) sodium acetylacetonate are introduced into the reaction flask while stirring. The temperature of the reaction mixture is brought to 102–113° C., and stirring is pursued at this temperature during 24 hours. The pH value of the mass should be kept between 5 and 6.

After 24 hours the mass is cooled down to 60° C. and operation is pursued as described in Example I.

The result is g. 235 pure product, melting point 196–197° C., purity 99.5%, the output being 91% of the theory calculated with respect to the starting sodium acetylacetonate and p-amino-benzenesulphonamido-guanidine.

*Example III*

Ml. 600 water, g. 99 (1 mol) pure acetylacetone and g. 214 (1 mol) anhydrous p-amino-benzenesulphonamido-guanidine or an equivalent quantity of non anhydrous products are introduced into a flask heated in an oil bath.

Operation is carried out as described in Example II. At the end of operation g. 253 (91% of the theory) 2-p-amino-benzenesulphonamido - 4,6 - dimethyl-pyrimidine, melting point 197° C., purity 99.68% are obtained.

What I claim is:

1. A method of preparing 2-p-amino-benzenesulphon-amido-4,6-dimethyl-pyrimidine which comprises providing a reaction medium consisting of water at a temperature between 80° C. and 120° C., supplying to said reaction medium and dissolving therein sodium acetylacetonate and a substantially equimolar amount of a decomposing acid for the sodium acetylacetonate, adding to the solution thus obtained and fully dissolving therein p-amino-benzenesulfphonamide-guanidine in an amount providing a 2 to 10 mole percent excess with respect to the sodium acetylacetonate, while maintaining said solution at a temperature between 80° C. and 120° C. to effect formation of 2-p-amino-benzenesulphonamido-4,6-dimethyl - pyrimidine, and cooling said solution to a temperature not lower than 60° C., thereby to separate from said solution the 2 - p - amino - benzenesulphonamido - 4,6 - dimethyl pyrimidine in a solid state.

2. A method of preparing 2-p-amino-benzenesulphonamido-4,6-dimethyl-pyrimidine which comprises providing a reaction medium consisting of water at a temperature between 80° C. and 120° C., supplying to said reaction medium and dissolving therein sodium acetylacetonate and a substantially equimolar amount of a decomposing acid for the sodium acetylacetonate, adding to the solution thus obtained and fully dissolving therein p-amino-benzenesulphonamido-guanidine in an amount providing a 2 to 10 mole percent excess with respect to the sodium acetylacetonate, while maintaining said solution at a temperature between 80° C. and 120° C. to effect formation of 2-p-amino-benzenesulphonamido-4,6-dimethyl - pyrimidine, cooling said solution to a temperature not lower than 60° C., thereby to precipitate from said solution the 2 - p - amino - benzenesulphonamido - 4,6 - dimethyl-pyrimidine in a solid state, recovering said last-named compound in said solid state, and further cooling the liquid residue remaining below 60° C. to separate and recover non-reacted p-amino - benzenesulphonamido-guanidine in a solid state.

3. A method of preparing 2-p-amino-benzenesulphonamido-4,6-dimethyl-pyrimidine which comprises providing a reaction medium consisting of water at a temperature between 80° C. and 120° C., supplying to said reaction medium and dissolving therein sodium acetylacetonate and a substantially equimolar amount of a decomposing acid for the sodium acetylacetonate, thereby to obtain acetylacetone dissolved in said medium, adding to the solution thus obtained and fully dissolving therein p-amino-benzenesulphonamido-guanidine in an amount providing a 2 to 10 mole percent excess with respect to the sodium acetylacetonate, maintaining said solution at a temperature between 80° and 120° C. until a sample of the solution to which ferrichloride is added no longer gives a purple red coloring to effect formation of 2-p-amino-benzenesulphonamido-4,6-dimethyl-pyrimidine, cooling said solution to a temperature not lower than 60° C., thereby to separate from said solution the 2-p-amino-benzenesulphonamido-4,6-dimethyl-pyrimidine in a solid state, recovering said last-named compound in said solid state and further cooling the liquid residue remaining below 60° C. to separate and recover non-reacted p-amino-benzenesulphonamido-guanidine in a solid state.

4. A method of preparing 2-p-amino-benzenesulphonamido-4,6-dimethyl-pyrimidine which comprises providing a reaction medium consisting of an aqueous solution at 80° to 120° C. of an acid capable of decomposing sodium acetylacetonate, supplying to said reaction medium and dissolving therein (*a*) sodium acetylacetonate in a substantially equimolar proportion to said acid and (*b*) p-amino-benzenesulphonamido-guanidine in an amount providing a 2 to 10 mole percent excess with respect to said sodium acetylacetonate, maintaining the thus obtained solution at a temperature between 80° and 120° C. to effect formation of 2-p-amino-benzenesulphonamido-4,6-dimethyl-pyrimidine, and cooling said solution to a temperature not lower than 60° C., thereby to separate from said solution the 2-p-amino-benzenesulphonamido-4,6-dimethyl-pyrimidine in a solid state.

References Cited in the file of this patent

UNITED STATES PATENTS

| | | |
|---|---|---|
| 2,435,002 | Hartmann et al. | Jan. 27, 1948 |
| 2,693,466 | Evans et al. | Nov. 2, 1954 |

FOREIGN PATENTS

| | | |
|---|---|---|
| 294,503 | Switzerland | Jan. 16, 1954 |